(12) United States Patent
Kim

(10) Patent No.: US 10,143,305 B2
(45) Date of Patent: Dec. 4, 2018

(54) ROLLER UNIT FOR DRAWER

(71) Applicant: SEGOS CO., LTD., Incheon (KR)

(72) Inventor: Jae Won Kim, Incheon (KR)

(73) Assignee: SEGOS CO., LTD. (KR)

( * ) Notice: Subject to any disclaimer, the term of this patent is extended or adjusted under 35 U.S.C. 154(b) by 0 days.

(21) Appl. No.: 15/311,740

(22) PCT Filed: Jun. 9, 2016

(86) PCT No.: PCT/KR2016/006134
§ 371 (c)(1),
(2) Date: Nov. 16, 2016

(87) PCT Pub. No.: WO2017/034133
PCT Pub. Date: Mar. 2, 2017

(65) Prior Publication Data
US 2018/0177296 A1  Jun. 28, 2018

(30) Foreign Application Priority Data

Aug. 24, 2015 (KR) .................. 10-2015-0118672
Jan. 7, 2016 (KR) .................. 10-2016-0002244

(51) Int. Cl.
*A47B 88/10* (2006.01)
*A47B 88/487* (2017.01)
(Continued)

(52) U.S. Cl.
CPC .......... *A47B 88/487* (2017.01); *A47B 88/437* (2017.01); *F16C 29/04* (2013.01);
(Continued)

(58) Field of Classification Search
CPC .............................. F16C 29/04; A47B 88/487
(Continued)

(56) References Cited

U.S. PATENT DOCUMENTS 2,786,726 A   3/1957 Tarr
3,361,489 A * 1/1968 Gionet .................. F16C 13/006
                                                        16/97
(Continued)

FOREIGN PATENT DOCUMENTS

FR   2177283 A7   11/1973
GB   1398222   *  6/1975
(Continued)

OTHER PUBLICATIONS

European Search Report corresponding to European Application No. 16808894.6, dated Feb. 1, 2018, pp. 1-7.
(Continued)

*Primary Examiner* — Thomas R Hannon
(74) *Attorney, Agent, or Firm* — Tarolli, Sundheim, Covell & Tummino LLP

(57) ABSTRACT

A roller unit for a drawer capable of decreasing the number of components, improving assembly productivity, and continuously maintaining a normal assembly state of the component by changing a structure of an assembled portion of the components configuring the roller unit. The roller unit includes a rotating support shaft fixed to an accommodation body, an idle roller idle-rotatably coupled to the rotating support shaft, and coupling structures provided at assembled portions of the rotating support shaft and the idle roller, respectively, the coupling structures including a locking groove formed in a circumferential direction with respect to an outer circumferential surface of the rotating support shaft, a protrusion formed on an inner circumferential surface of a fastening hole of the idle roller and coupled to the locking groove, and an assembly guiding groove formed at one end of the outer circumferential surface of the rotating support shaft.

6 Claims, 7 Drawing Sheets

(51) Int. Cl.
*A47B 88/437* (2017.01)
*F16C 29/04* (2006.01)
*B60B 33/00* (2006.01)

(52) U.S. Cl.
CPC ..... *A47B 2210/175* (2013.01); *B60B 33/0028* (2013.01); *B60B 2200/20* (2013.01)

(58) Field of Classification Search
USPC .................................................. 384/19, 58
See application file for complete search history.

(56) References Cited

U.S. PATENT DOCUMENTS

| 9,068,385 B2 * | 6/2015 | Proctor | E05D 15/063 |
| 2015/0342349 A1 * | 12/2015 | Koelling | A47B 88/14 |
| | | | 384/19 |

FOREIGN PATENT DOCUMENTS

| JP | 06-038694 U | 5/1994 |
| KR | 10-2006-0101363 A | 9/2006 |
| KR | 20-0452543 Y1 | 3/2011 |
| KR | 10-1391249 B1 | 5/2014 |
| KR | 10-2015-0092131 A | 8/2015 |

OTHER PUBLICATIONS

International Search Report for Application No. PCT/KR2016/006134 dated Oct. 14, 2016.

\* cited by examiner

ROLLER UNIT FOR DRAWER

RELATED APPLICATIONS

The present invention is a U.S. National Stage under 35 USC 371 patent application, claiming priority to Ser. No. PCT/KR2016/006134, filed on 9 Jun. 2016; which claims priority from KR 10-2015-0118672, filed 24 Aug. 2016, and KR 10-2016-0002244, filed 7 Jan. 2016, the entirety of all of which are incorporated herein by reference.

TECHNICAL FIELD

Exemplary embodiments of the present invention relate to a roller unit for a drawer, and more particularly, to a roller unit for a drawer capable of decreasing the number of components, improving assembly productivity, and continuously maintaining a normal assembly state of the component by changing a structure of an assembled portion of the components configuring the roller unit.

BACKGROUND ART

Generally, a roller unit is a component in which a cylindrical wheel is rotatably coupled with a fastening member to change sliding friction generated at the time of sliding into rolling friction to reduce frictional resistance, which is applied in various fields such as furniture or refrigerator having a slidably movable accommodation body to allow smooth opening and closing operation that is required by a user in a process of opening and closing the accommodation body.

A roller unit according to the related art is configured of a wheel (rotating body), a support shaft, and a locking member that is coupled to a mounting portion of the support shaft to lock coupling between the support shaft and the wheel as disclosed in Korean Patent No. 10-0822749.

However, in the existing roller unit disclosed in Korean Patent No. 10-822749, a separate locking member needs to be provided in order to prevent separation between the wheel and the support shaft after coupling, which causes an increase in product costs.

Further, the roller unit according to the related art has a problem that a portion that is plastic-deformed for the coupling between the wheel and the support shaft is corroded such that the wheel and the support shaft are separated from each other.

DISCLOSURE

Technical Problem

An object of the present invention is to decrease the number of components required for assembly to thereby improve both of assemblability and productivity of the components by changing a structure of an assembled portion of the components configuring a roller unit.

Another object of the present invention is to further improve assemblability by adding a structure for guiding assembly in a coupling structure of the components configuring the roller unit and to extend durability life of the component by continuously maintaining a coupled state after assembly, thereby maximizing marketability.

Technical Solution

In accordance with one aspect of the present invention, a roller unit for a drawer includes: a rotating support shaft fixed to a slidably movable accommodation body; an idle roller idle-rotatably coupled to the rotating support shaft; and coupling structures provided at assembled portions of the rotating support shaft and the idle roller, respectively to prevent unwanted separation after assembly.

The coupling structures may include a locking groove formed in a circumferential direction with respect to an outer circumferential surface of the rotating support shaft, and a protrusion formed on an inner circumferential surface of a fastening hole of the idle roller and protruding toward the outside so as to be coupled to the locking groove.

The locking groove may be continuously formed along the entire outer circumferential surface of the rotating support shaft, and the protrusion may be continuously formed along the entire inner circumferential surface of the fastening hole in order to continuously contact the locking groove.

The coupling structures may include a locking groove formed in a circumferential direction with respect to an outer circumferential surface of the rotating support shaft, a protrusion formed on an inner circumferential surface of a fastening hole of the idle roller and protruding toward the outside so as to be coupled to the locking groove, and an assembly guiding groove formed at one end of the outer circumferential surface of the rotating support shaft toward the locking groove, the locking groove being continuously formed along the entire outer circumferential surface of the rotating support shaft and the protrusion being formed as a plurality of fragments while being spaced apart from each other along the entire inner circumferential surface of the fastening hole.

The assembly guiding groove may include a primary guiding groove formed to induce entrance of the protrusion toward the locking groove from one end of the outer circumferential surface of the rotating support shaft, and a secondary guiding groove continuously formed from the primary guiding groove to induce entrance of the protrusion toward the locking groove from the primary guiding groove and limiting separation of the protrusion from the locking groove.

The primary guiding groove may be formed to be inclined based on an axial direction of the rotating support shaft toward the locking groove at one end of the outer circumferential surface of the rotating support shaft.

The secondary guiding groove may be formed parallel to an axial direction of the rotating support shaft toward the locking groove from the primary guiding groove.

The secondary guiding groove may be formed to be inclined in a direction opposite to a direction in which the primary guiding groove is inclined based on an axial direction of the rotating support shaft toward the locking groove from the primary guiding groove.

An inner surface of the secondary guiding groove that faces the protrusion may have a width gradually narrowed toward the locking groove.

A depth of the locking groove may be deeper than a depth of the assembly guiding groove, and a height of the protrusion may be smaller than the depth of the locking groove and larger than the depth of the assembly guiding groove.

Advantageous Effects

According to the present invention, it is possible to decrease the number of components as compared to the existing configuration by limiting the components required for assembly to include only the rotating support shaft and the idle roller by changing the structure of the assembled portion of the components configuring the roller unit, thereby improving both of the assemblability and productivity.

Further, according to the present invention, in changing the structure of the components configuring the roller unit, it is possible to more easily assemble the idle roller to the rotating support shaft by adding the separate structure for guiding assembly, and effectively suppress the separation of the protrusion of the idle roller from the locking groove of the rotating support shaft after assembly, thereby extending durability lift of the components, such that the marketability of the components may be further improved.

DETAILED DESCRIPTION OF MAIN ELEMENTS

| | |
|---|---|
| 100-Rotating support shaft | 120-Large-diameter portion |
| 122-Insertion groove | 140-Small-diameter portion |
| 142-Screw part | 160-Locking groove |
| 180-Assembly guiding groove | 182-Primary guiding groove |
| 184, 184'-Secondary guiding groove | 200-Idle roller |
| 220-Fastening hole | 240-Seating groove |
| 260-Protrusion | |

Best Mode

Hereinafter, preferred exemplary embodiments of the present invention will be described in detail with reference to the accompanying drawings.

A roller unit for a drawer according to preferred exemplary embodiments of the present invention is applicable for a drawer of household appliances such as a refrigerator, and general furniture, and has a structure capable of facilitating coupling of relevant components and maximally preventing separation between the relevant components.

First Exemplary Embodiment

Figure 1:
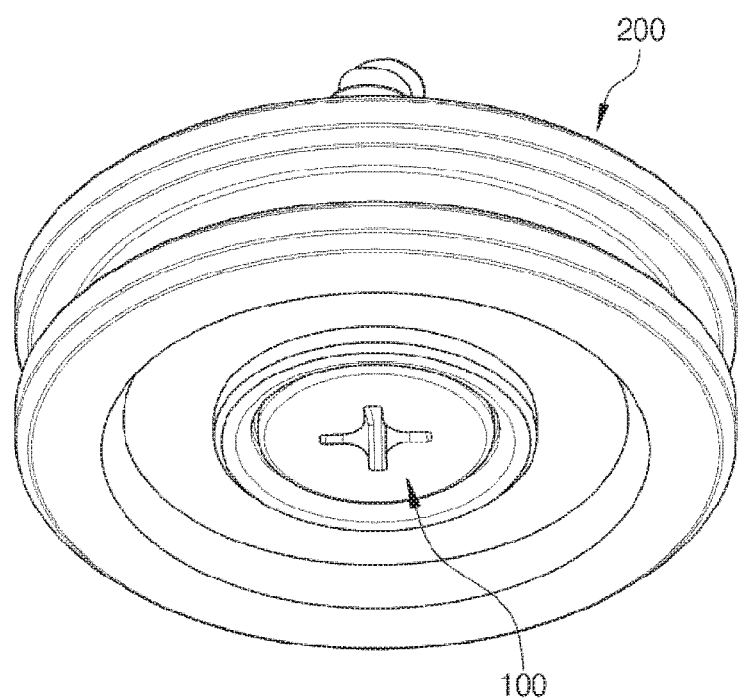
FIG. 1 is a perspective view illustrating a roller unit for a drawer according to an exemplary embodiment of the present invention.
Figure 2:
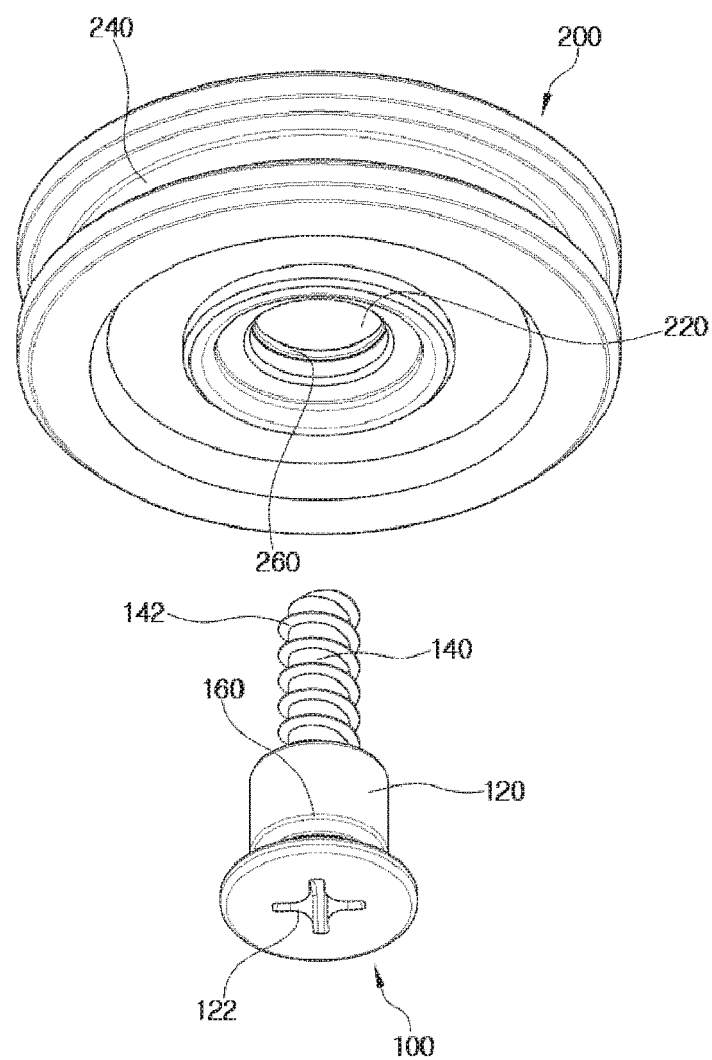
FIG. 2 is an exploded perspective view of FIG. 1.
Figure 3:
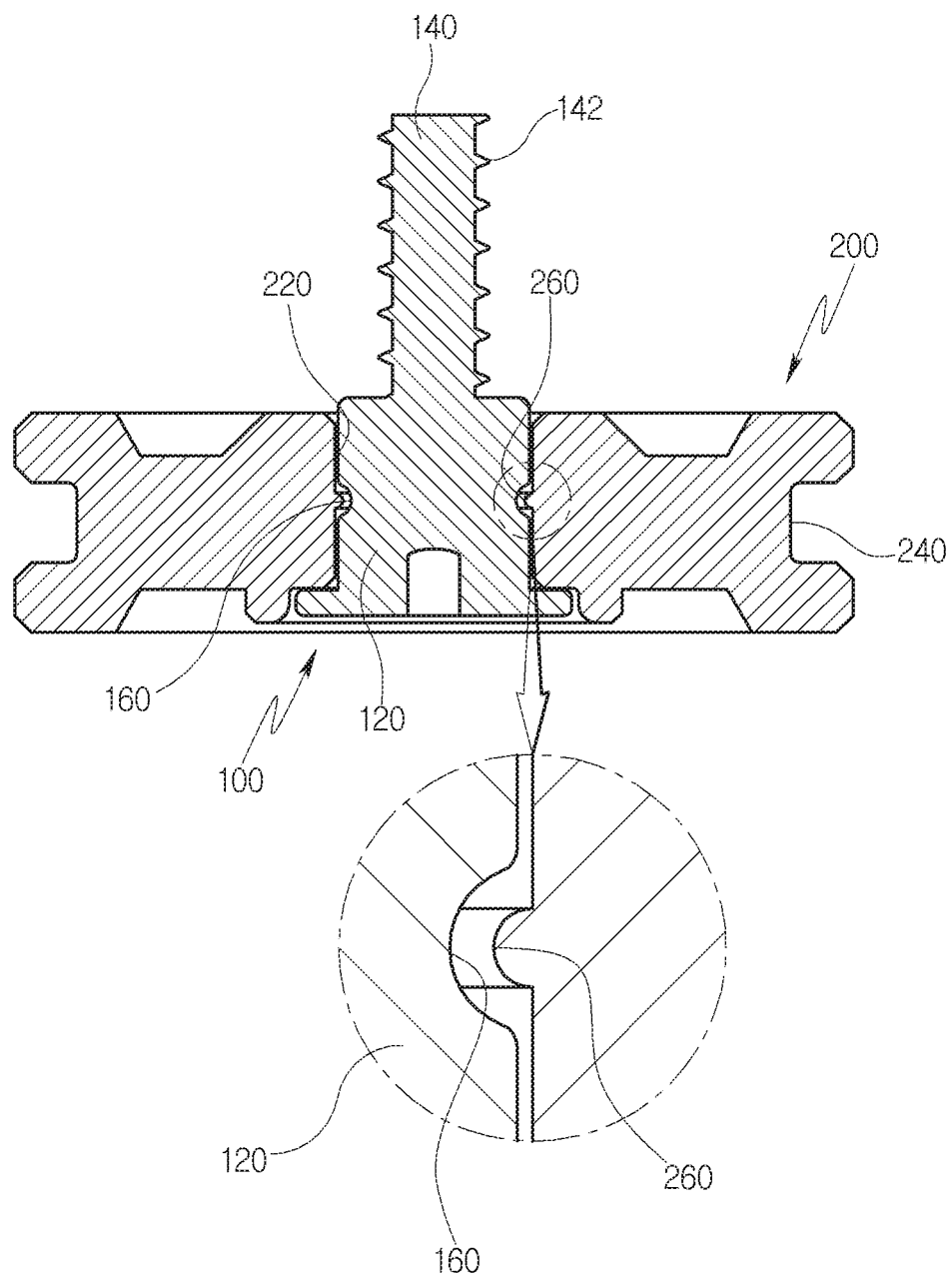
FIG. 3 is a cross-sectional view of FIG. 1.

FIG. 1 is a perspective view illustrating a roller unit for a drawer according to an exemplary embodiment of the present invention, FIG. 2 is an exploded perspective view of FIG. 1, and FIG. 3 is a cross-sectional view of FIG. 1.

Referring to FIGS. 1 to 3, a roller unit for a drawer according to an exemplary embodiment of the present invention is configured to include a rotating support shaft 100 fixed to an accommodation body (not illustrated), an idle roller 200 idle-rotatably coupled to the rotating support shaft 100, and coupling structures provided at assembled portions of the rotating support shaft 100 and the idle roller 200, respectively, to more simply implement the coupling between the rotating support shaft and the idle roller 200.

The rotating support shaft 100 is fixed to the accommodation body in a screw fastening manner so that the accommodation body is installed to be slidably movable with respect to a main body, and is fixed at a plurality of portions in both sides of the accommodation body. Further, it is preferable that the rotating support shaft 100 is made of a metal material in order to implement a predetermined support stiffness or greater.

To this end, the rotating support shaft 100 is a solid type body formed in a stepped shape having different diameters, and includes a large-diameter portion 120 and a small-diameter portion 140 that are integrally formed. First, the large-diameter portion 120 that is a portion to which the idle roller 200 is idle-rotatably coupled, is integrally formed with an insertion groove 122 for fastening by a hand tool (e.g. a flathead screwdriver or a phillips screwdriver) at one side thereof. Further, the small-diameter portion 140 is integrally formed with a screw part 142 for screw-fastening with the accommodation body.

The idle roller 200 has a fastening hole 220 penetrating through a material and formed at a central portion thereof for coupling with the large-diameter portion 120 of the rotating support shaft 100, and a concave seating groove 240 formed along an entire outer circumferential surface for coupling with a guide rail (not illustrated) in a sliding manner. In this case, the idle roller 200 may be made of a plastic material to have a predetermined strength or greater and decrease a load, for example, may be made of an acrylonitrile butadiene styrene (ABS), polymethylene (POM), etc.

The coupling structure is configured to induce the coupling of the idle roller 200 with respect to the rotating support shaft 100 in a forcible fitting manner by a one-touch push operation, and prevent unwanted separation after coupling by more stably implementing assembly therebetween.

To this end, the coupling structure includes a locking groove 160 formed in a circumferential direction with respect to an outer circumferential surface of the large-diameter portion 120 of the rotating support shaft 100, and a protrusion 260 formed on an inner circumferential surface of the fastening hole 220 of the idle roller 200 and protruding at a predetermined length toward the outside so as to be coupled with the locking groove 160. On the other hand, although not illustrated in the drawings in detail, the locking groove 160 may be formed in the inner circumferential surface of the fastening hole 220 of the idle roller 200 and the protrusion 260 may be formed on the outer circumferential surface of the large-diameter portion 120 of the rotating support shaft 100.

In an exemplary embodiment of the present invention to be described below, the case in which the locking groove 160 may be formed in the outer circumferential surface of the large-diameter portion 120 of the rotating support shaft 100 and the protrusion 260 is formed on the inner circumferential surface of the fastening hole 220 of the idle roller 200 will be described in more detail.

The locking groove 160 is continuously formed along the entire outer circumferential surface of the large-diameter portion 120 of the rotating support shaft 100 and the protrusion 260 is continuously formed along the entire inner circumferential surface of the fastening hole 220 of the idle roller 200.

In this case, it is preferable that the outer circumferential surface of the large-diameter portion 120 of the rotating support shaft 100 is assembled with the inner circumferential surface of the fastening hole 220 of the idle roller 200 with an appropriate tolerance. That is, the large-diameter portion 120 of the rotating support shaft 100 is formed to have an outer circumferential diameter having a size for setting some clearance as compared to a diameter of the inner circumferential surface of the fastening hole 220, in order to allow the idle roller 200 to freely idle As a result, in the roller unit for a drawer according to an exemplary embodiment of the present invention, the rotating support shaft 100 and the idle roller 200 may be more rapidly assembled through mutual coupling between the locking groove 160 formed in the outer circumferential surface of the large-diameter portion 120 of the rotating support shaft 100 and the protrusion formed on the inner circumferential surface of the fastening hole 220 of the idle roller 200, thereby improving assembly productivity. That is, at the time of assembling, the protrusion 260 is contracted due to elasticity of a material thereof when the protrusion 260 contacts the large-diameter portion 120, and is restored in the locking groove 160, thus the fastening hole 200 the idle roller 200 may free idle with respect to the large-diameter portion 120 of the rotating support shaft 100.

Further, by the coupling in a state in which the locking groove 160 and the protrusion 260 are mutually locked, unwanted separation between the rotating support shaft 100 and the idle roller 200 may be prevented. That is, since the locking groove 160 and the protrusion 260 may be coupled to each other in the forcible fitting manner by the one-touch push operation, the roller unit for a drawer according to the exemplary embodiment of the present invention may implement all the desired functions with a smaller number of components as compared to the related art, thereby improving assemblability and productivity and reducing costs.

Second Exemplary Embodiment

Figure 4:
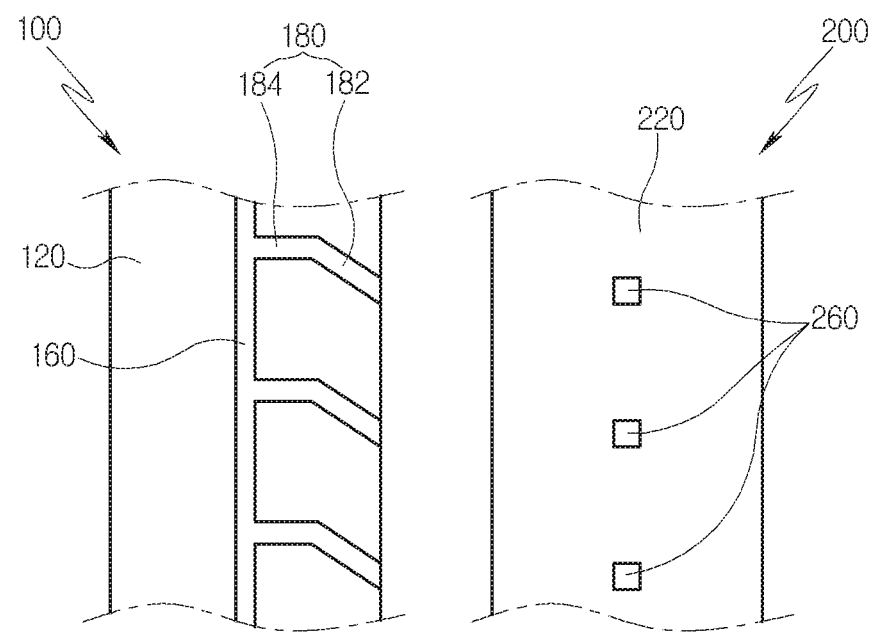
FIG. 4 is a view illustrating an outer circumferential surface of a rotating support shaft and an inner circumferential surface of an idle roller, the rotating support shaft and the idle roller configuring a roller unit for a drawer according to another exemplary embodiment of the present invention.
Figure 5:
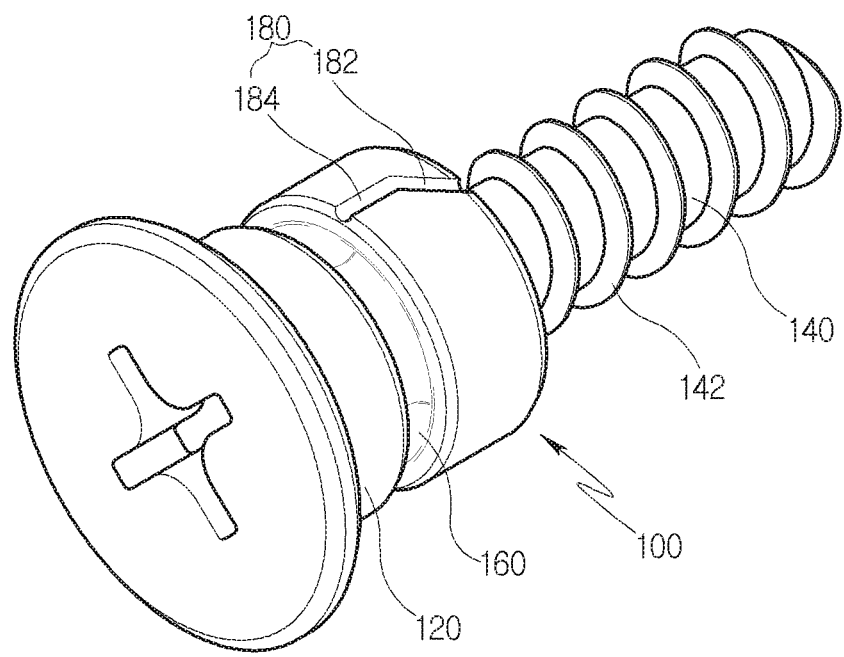
FIG. 5 is a perspective view illustrating a rotating support shaft configuring a roller unit for a drawer according to another exemplary embodiment of the present invention.

FIG. 4 is an exploded view illustrating a structure of an outer circumferential surface of a rotating support shaft and an inner circumferential surface of an idle roller to facilitate understanding, the rotating support shaft and the idle roller configuring a roller unit for a drawer according to another exemplary embodiment of the present invention, and FIG. 5 is a perspective view illustrating a rotating support shaft configuring a roller unit for a drawer according to another exemplary embodiment of the present invention.

Referring to FIGS. 4 and 5, a roller unit for a drawer according to another exemplary embodiment of the present invention includes a rotating support shaft 100 and an idle roller 200 having the same configuration as an exemplary embodiment described above. However, the roller unit for a drawer according to another exemplary embodiment of the present invention has a structure in which configuration of a coupling structure is different from that in an exemplary embodiment described above, thus, only the configuration of the coupling structure will be mainly described.

The coupling structure includes a locking groove 160 formed in a circumferential direction with respect to the outer circumferential surface of the large-diameter portion 120 of the rotating support shaft 100, a protrusion 260 formed on the inner circumferential surface of the fastening hole 220 of the idle roller 200 and protruding at a predetermined length toward the outside so as to be coupled with the locking groove 160, and an assembly guiding groove 180 formed at one end of the outer circumferential surface of the large-diameter portion 120 of the rotating support shaft 100 toward the locking groove 160.

In this case, the locking groove 160 is continuously formed along the entire outer circumferential surface of the large-diameter portion 120 of the rotating support shaft 100 and the protrusion 260 is formed as a plurality of fragments that are spaced apart from each other along the entire inner circumferential surface of the fastening hole 220 of the idle roller 200.

Further, the assembly guiding groove 180 is formed in plural while having a predetermined interval therebetween along the entire outer circumferential surface of the large-diameter portion 120 of the rotating support shaft 100 and the protrusion 260 in the fragment form is also formed in plural while being spaced apart from each other along the entire inner circumferential surface of the fastening hole 220 of the idle roller 200 with the same interval as that of the assembly guiding groove 180. In particular, the assembly guiding groove 180 may be formed in various shapes such as a curved type or a bending type toward the locking groove 160 that is formed in the inner circumferential surface of the idle roller 200 at one end of the outer circumferential surface of the large-diameter portion 120 of the rotating support shaft 100.

As an example, the bending type assembly guiding groove 180 is configured to include a primary guiding groove 182 inducing entrance of the protrusion 260 having a fragment shape toward the locking groove 160 from one end of the outer circumferential surface of the large-diameter portion 120 of the rotating support shaft 100, and a secondary guiding groove 184 continuously formed from a longitudinal end of the primary guiding groove 182 to induce entrance of the protrusion 260 having a fragment shape toward the locking groove 160 from the primary guiding groove 182, and limiting separation of the protrusion 260 from the locking groove 160.

In this case, the primary guiding groove 182 is formed to be inclined toward the locking groove 160 at one end of the outer circumferential surface of the rotating support shaft 100. That is, the primary guiding groove 182 is formed in an inclined direction toward the locking groove 160 based on an axial direction of the rotating support shaft 100 at one end of the outer circumferential surface of the large-diameter portion 120.

Further, the secondary guiding groove 184 is formed parallel to the axial direction of the rotating support shaft 100 toward the locking groove 160 from the primary guiding groove 182.

In particular, it is preferable that an inner surface of at least one of the primary guiding groove 182 and the secondary guiding groove 184 that faces the protrusion 260 has a width gradually narrowed toward the locking groove 160, to limit separation of the protrusion 260 from the locking groove 160. In the exemplary embodiment of the present invention, description will be made based on a case in which the inner surface of the secondary guiding groove 184 of the assembly guiding groove 180 that faces the protrusion 260 has a width gradually narrowed toward the locking groove 160.

Further, the locking groove 160 is formed to be deeper than the assembly guiding groove 180, and it is preferable that a height of the protrusion 260 is smaller than a depth of the locking groove 160 and larger than a depth of the assembly guiding groove 180.

As a result, in the roller unit for a drawer according to the second exemplary embodiment of the present invention, similarly to the first exemplary embodiment, the rotating support shaft 100 and the idle roller 200 may be more rapidly assembled through mutual coupling between the locking groove 160 formed in the outer circumferential surface of the large-diameter portion 120 of the rotating support shaft 100 and the protrusion formed on the inner circumferential surface of the fastening hole 220 of the idle roller 200, thereby improving assembly productivity.

Particularly, according to the second exemplary embodiment, in the process in which the protrusion 260 having a fragment shape is inserted into the locking groove 160 via the assembly guiding groove 180, the primary guiding groove 182 and the secondary guiding groove 184 may implement a function of limiting unwanted separation after assembly in addition to the function of more facilitating the assembly by smoothly guiding the entrance of the protrusion 260.

This is possible because the depth of the locking groove 160 is deeper than that of the assembly guiding groove 180, and the height of the protrusion 260 is smaller than the depth of the locking groove 160 and larger than the depth of the assembly guiding groove 180. In particular, as the inner surface of at least one of the primary guiding groove 182 and the secondary guiding groove 184 configuring the assembly guiding groove 180 has a width gradually narrowed toward the locking groove 160, the coupling between the locking groove 160 and the protrusion 260 having a fragment shape may be more firmly maintained, the inner surface facing the protrusion 260.

Third Exemplary Embodiment

Figure 6:
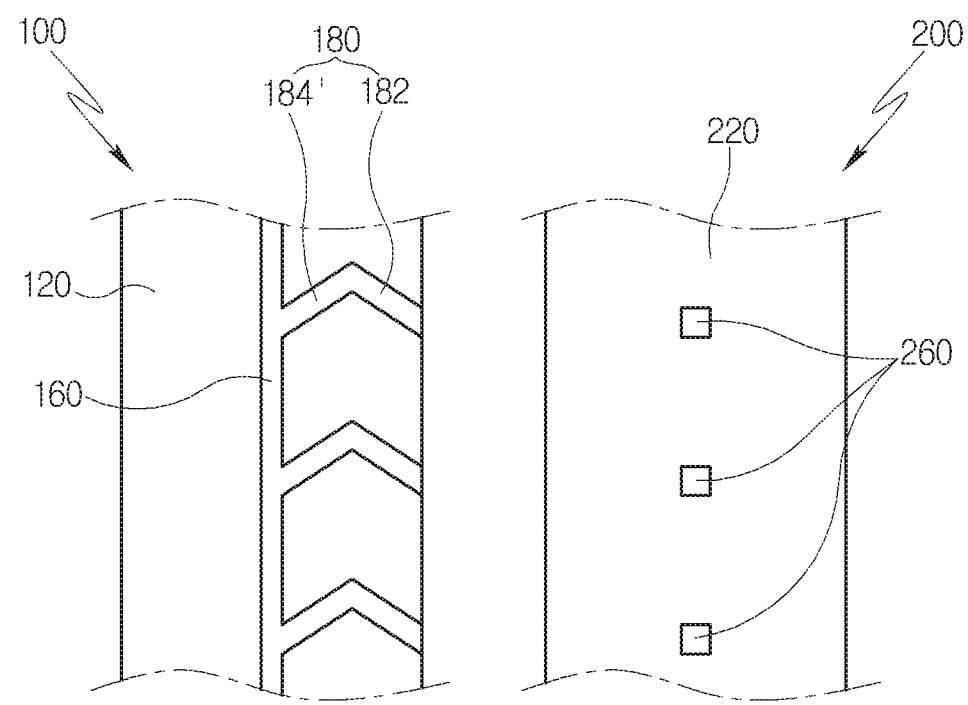
FIG. 6 is a view illustrating an outer circumferential surface of a rotating support shaft and an inner circumferential surface of an idle roller, the rotating support shaft and the idle roller configuring a roller unit for a drawer according to still another exemplary embodiment of the present invention.
Figure 7:
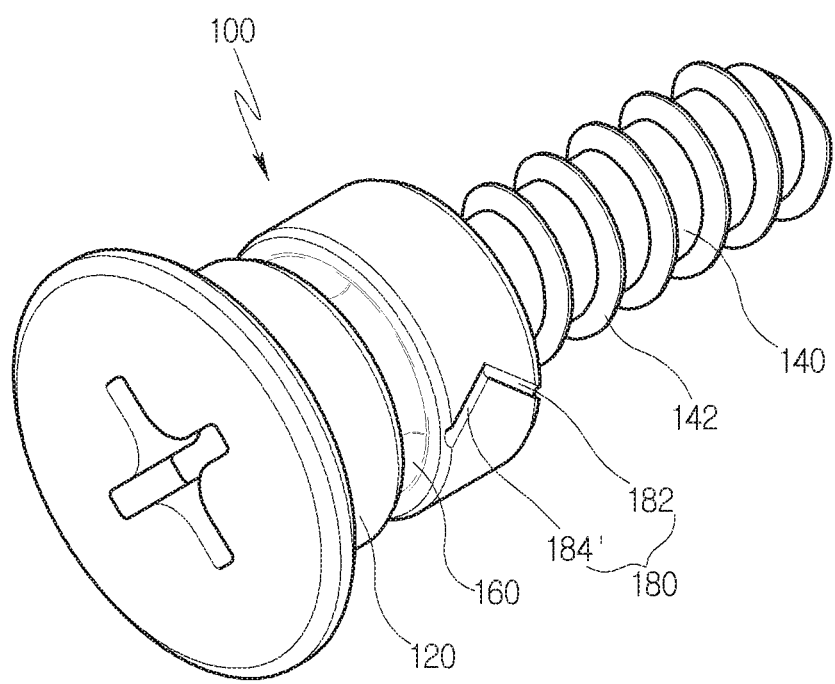
FIG. 7 is a perspective view illustrating a rotating support shaft configuring a roller unit for a drawer according to still another exemplary embodiment of the present invention.

FIG. 6 is an exploded view illustrating a structure of an outer circumferential surface of a rotating support shaft and an inner circumferential surface of an idle roller to facilitate understanding, the rotating support shaft and the idle roller configuring a roller unit for a drawer according to still another exemplary embodiment of the present invention, and FIG. 7 is a perspective view illustrating a rotating support shaft configuring a roller unit for a drawer according to still another exemplary embodiment of the present invention.

Referring to FIGS. 6 and 7, a roller unit for a drawer according to still another exemplary embodiment of the present invention includes a rotating support shaft 100, an idle roller 200, and a coupling structure having the same configuration as the exemplary embodiment of FIGS. 5 and 6. However, the roller unit for a drawer according to still another exemplary embodiment of the present invention has a structure in which configuration of an assembly guiding groove 180 in the coupling structure is different from that in the exemplary embodiment of FIGS. 5 and 6, thus, only the configuration of the assembly guiding groove 180 will be mainly described.

The assembly guiding groove 180 is configured to include a primary guiding groove 182 inducing entrance of the protrusion 260 having a fragment shape toward the locking groove 160 from one end of the outer circumferential surface of the large-diameter portion 120 of the rotating support shaft 100, and a secondary guiding groove 184' continuously formed from a longitudinal end of the primary guiding groove 182 to induce entrance of the protrusion 260 having a fragment shape toward the locking groove 160 from the primary guiding groove 182, and limiting separation of the protrusion 260 from the locking groove 160.

In this case, the primary guiding groove 182 is formed to be inclined toward the locking groove 160 at one end of the outer circumferential surface of the rotating support shaft 100. That is, the primary guiding groove 182 is formed in an inclined direction toward the locking groove 160 based on the axial direction of the rotating support shaft 100 at one end of the outer circumferential surface of the large-diameter portion 120.

Further, the secondary guiding groove 184' is formed to be inclined in a direction opposite to the direction in which the primary guiding groove 182 is inclined based on the axial direction of the rotating support shaft 100 toward the locking groove 160 from the primary guiding groove 182.

In particular, it is preferable that an inner surface of at least one of the primary guiding groove 182 and the secondary guiding groove 184' that faces the protrusion 260 has a width gradually narrowed toward the locking groove 160, to limit separation of the protrusion 260 from the locking groove 160. In the exemplary embodiment of the present invention, description will be made based on a case in which the inner surface of the secondary guiding groove 184' of the assembly guiding groove 180 that faces the protrusion 260 has a width gradually narrowed toward the locking groove 160.

Further, the locking groove 160 is formed to be deeper than the assembly guiding groove 180, and it is preferable that a height of the protrusion 260 is smaller than a depth of the locking groove 160 and larger than a depth of the assembly guiding groove 180.

As a result, in the roller unit for a drawer according to the third exemplary embodiment of the present invention, similarly to the second exemplary embodiment, the rotating support shaft 100 and the idle roller 200 may be more rapidly assembled through mutual coupling between the locking groove 160 formed in the outer circumferential surface of the large-diameter portion 120 of the rotating support shaft 100 and the protrusion formed on the inner circumferential surface of the fastening hole 220 of the idle roller 200, thereby improving assembly productivity.

Further, according to the third exemplary embodiment, in the process in which the protrusion 260 having a fragment shape is inserted into the locking groove 160 via the assembly guiding groove 180, the primary guiding groove 182 and the secondary guiding groove 184' may implement the function of limiting unwanted separation after assembly in addition to the function of more facilitating the assembly by smoothly guiding the entrance of the protrusion 260.

This is possible because the depth of the locking groove 160 is deeper than that of the assembly guiding groove 180, and the height of the protrusion 260 is smaller than the depth of the locking groove 160 and larger than the depth of the assembly guiding groove 180. In particular, as the inner surface of at least one of the primary guiding groove 182 and the secondary guiding groove 184' configuring the assembly guiding groove 180 has a width gradually narrowed toward the locking groove 160, the coupling between the locking groove 160 and the protrusion 260 having a fragment shape may be more firmly maintained, the inner surface facing the protrusion 260.

Particularly, in the third exemplary embodiment, unlike the second exemplary embodiment, as the secondary guiding groove 184' is formed to be inclined in the opposite direction toward the locking groove 160 from the primary guiding groove 182, unwanted separation between the locking groove 160 and the protrusion 260 having a fragment shape after assembly may be more actively prevented.

Although the preferred exemplary embodiments of the present invention have been described with reference to the accompanying drawings, the present invention is not limited thereto but various modifications and alterations might be made by those skilled in the art to which the present invention pertains without departing from the spirit of the present invention and the scope defined in the claims and their equivalents.

The invention claimed is:

1. A roller unit for a drawer, comprising:
a rotating support shaft fixed to a slidably movable accommodation body;
an idle roller idle-rotatably coupled to the rotating support shaft; and
coupling structures provided at assembled portions of the rotating support shaft and the idle roller, respectively,
wherein the coupling structures include a locking groove formed in a circumferential direction with respect to an outer circumferential surface of the rotating support shaft, a protrusion formed on an inner circumferential surface of a fastening hole of the idle roller and coupled to the locking groove, and an assembly guiding groove formed at one end of the outer circumferential surface of the rotating support shaft toward the locking groove, the locking groove being continuously formed along the entire outer circumferential surface of the rotating support shaft and the protrusion being formed as a plurality of fragments while being spaced apart from each other along the entire inner circumferential surface of the fastening hole, wherein the assembly guiding groove includes a primary guiding groove formed to induce entrance of the protrusion toward the locking groove from one end of the outer circumferential surface of the rotating support shaft, and a secondary guiding groove continuously formed from the primary guiding groove to induce entrance of the protrusion toward the locking groove from the primary guiding groove.

2. The roller unit for a drawer of claim 1, wherein the primary guiding groove is formed to be inclined based on an axial direction of the rotating support shaft toward the locking groove at one end of the outer circumferential surface of the rotating support shaft.

3. The roller unit for a drawer of claim 1, wherein the secondary guiding groove is formed parallel to an axial direction of the rotating support shaft toward the locking groove (160) from the primary guiding groove.

4. The roller unit for a drawer of claim 1, wherein the secondary guiding groove is formed to be inclined in a direction opposite to a direction in which the primary guiding groove is inclined based on an axial direction of the rotating support shaft toward the locking groove from the primary guiding groove.

5. The roller unit for a drawer of claim 1, wherein an inner surface of the secondary guiding groove that faces the protrusion has a width gradually narrowed toward the locking groove.

6. The roller unit for a drawer of claim 1, wherein a depth of the locking groove is deeper than a depth of the assembly guiding groove, and a height of the protrusion is smaller than the depth of the locking groove and larger than the depth of the assembly guiding groove.

* * * * *